United States Patent Office 3,235,563
Patented Feb. 15, 1966

3,235,563
PROCESS FOR PRODUCING DL-2-PYRROLIDONE-CARBOXYLIC ACID BY HEATING GLUTAMIC ACID WITH FROM 0.5 TO 15 PARTS BY WEIGHT OF WATER PER PART OF GLUTAMIC ACID
Gentaro Noyori, Hidemoto Kurokawa, and Teiko Watanabe, Tokyo, Japan, assignors to The Noguchi Institute, Tokyo, Japan, an incorporated body of Japan
No Drawing. Filed Dec. 18, 1962, Ser. No. 245,431
9 Claims. (Cl. 260—326.3)

The present invention relates to a process for the production of DL-2-pyrrolidone-5-carboxylic acid. More particularly, it relates to a process for the production of DL-2-pyrrolidone-5-carboxylic acid from an optically active or racemic glutamic acid.

An object of the invention is to provide an economically advantageous process for the production of DL-2-pyrrolidone-5-carboxylic acid in substantially pure form with favorable yield from D-, L- or DL-glutamic acid. Another object of the invention is to provide a novel process for the conversion of an optically active glutamic acid to DL-2-pyrrolidone-5-carboxylic acid, which can then be converted into DL-glutamic acid or be resolved into an optically active 2-pyrrolidone-5-carboxylic acid. Other objects will be apparent from the following description.

Synthetic production of glutamic acid is now broadly developed. The product in this case is racemic glutamic acid, which has to be resolved into its L- and D-forms. The D-glutamic acid is ordinarily racemized into the DL-form, which is further resolved, and finally all of the DL-form is converted to the L-form. Since DL-2-pyrrolidone-5-carboxylic acid can readily be converted into DL-glutamic acid by hydrolysis, D-glutamic acid could be easily converted into DL-glutamic acid by use of the process of the invention. In some cases, the resolution in the form of the 2-pyrrolidone-5-carboxylic acid is more desirable rather than that in the form of glutamic acid. For that purpose, DL-glutamic acid can easily be converted into DL-2-pyrrolidone-5-carboxylic acid by means of the process of the invention.

For the production of DL-2-pyrrolidone-5-carboxylic acid from L-glutamic acid, a process as heretofore known, in which L-glutamic acid is molten at a temperature of 190° to 200° C., whereby to be converted into L-2-pyrrolidone-5-carboxylic acid by removal of water, which is further heated until racemization is completed. (See L. E. Arnow and J. C. Opsahl; Journal of Biological Chemistry 139, 649 (1940).) This process appears to be simple and commercially advantageous at a glance. However, this process needs a considerably long period of heating time for the complete racemization. The heating time needed is much longer when the treating amount is large. Consequently, the process is accompanied by appreciable decomposition and discoloration causing loss of the glutamic acid product. Besides, the handling of the product which solidifies upon cooling of the molten reaction mass is troublesome in this process.

According to the invention, a process for the production of DL-2-pyrrolidone-5-carboxylic acid is provided, which process comprises heating glutamic acid with water in an amount of 0.5 to 15 parts per part of glutamic acid, whereby to give crystalline DL-2-pyrrolidone-5-carboxylic acid.

Glutamic acid to be converted to DL-2-pyrrolidone-5-carboxylic acid according to the present invention may be of an optically active, i.e. D- or L-form, or of racemic body, or a mixture thereof. In case of an optically active glutamic acid, the process of the present invention gives DL-2-pyrrolidone-5-carboxylic acid by the accompanying racemization.

In carrying out the process of the invention, D-, L-, or DL-glutamic acid, or their mixture, is commingled or suspended in water in an amount of 0.5 to 15 parts per part of the acid, and the mixture is heated at 100° to 230° C. Of course, the heating is effected in a pressure vessel under such a pressure that the desired temperature is attained. The period of time for the completion of the reaction varys depending upon the reaction temperature, but ordinarily is from 0.5 to 5 hours. After completion of the reaction, the reaction mass is cooled, and the isolated crystals are separated, for example, by filtration. By such a simple procedure, substantially pure crystals of the DL-2-pyrrolidone-5-carboxylic acid can be obtained, even when the heating period of time is somewhat shorter for the complete racemization. This is one of the characteristic features of the present invention, and the reason may be construed as follows.

When D- or L-glutamic acid is heated along with water according to the process of the invention, D- or L-2-pyrrolidone-5-carboxylic acid is mainly formed at the earlier stage, which is gradually racemized to the DL-pyrrolidonecarboxylic acid by continuation of the heating. Depending upon the heating temperature and the period of time, however, the product is a mixture of D- or L-pyrrolidonecarboxylic acid, DL-pyrrolidonecarboxylic acid and glutamic acid in a certain proportion of the amounts. In aqueous solution, there is an equilibrium relationship between the pyrrolidonecarboxylic acid and glutamic acid. When free glutamic acid participates in the reaction, 92.5% of the acid is converted into the pyrrolidonecarboxylic acid, but 7.5% remains as it was. There are remarkable differences in the solubilities in water, of these component in the mixture. One part of the D- or L-2-pyrrolidone-5-carboxylic acid is dissolved in 2.1 parts of water at 13° C., but one part of the DL-2-pyrrolidone-5-carboxylic acid needs 19 parts of water for the complete dissolution at 13° C. Although glutamic acid alone is hardly soluble in water, its solubility is markedly increased in an aqueous solution containing a large amount of the pyrrolidonecarboxylic acid. As a result of these solubility differences, complete racemization of pyrrolidonecarboxylic acid by keeping the reaction mixture at a required high temperature for a required long period of time is not necessarily needed for the separation of the DL-2-pyrrolidone-5-carboxylic acid from the reaction mass in pure form. The DL-2-pyrrolidone-5-carboxylic acid crystals can be isolated in pure form from an aqueous mixture containing a certain amount of the DL-pyrrolidone-carboxylic acid, along with D- or L-2-pyrrolidone-5-carboxylic acid and glutamic acid.

If water added is in an amount of less than 0.5 part by weight per part of glutamic acid, DL-2-pyrrolidone-5-carboxylic acid is contaminated with glutamic acid. If water is more than 15 parts by weight per part of glutamic acid, DL-2-pyrrolidone-5-carboxylic acid hardly precipitates after cooling.

As to racemization of N-acetylglutamic acid by means of acetic anhydride, V du Vignaud et al. (see Journal of Biological Chemistry 98, 297 (1932)) have illustrated the relationship between optical rotatory power and time. In this instance, the rotatory power is rapidly lowered at the earlier stage, but the degree of the lowering is decreased as the time elapses. In other words, the racemization is completed after 8 hours, but about 85% of the racemization is over after about 3 hours. The relationship in the racemization of the DL-pyrrolidonecarboxylic acid by heating is now found to be almost the same as the case mentioned above. Thus, the heating time for about 80 to 90% racemization is one half or less of that for the complete racemization. Accordingly, the process of the invention permits reduction of the reaction time needed.

Furthermore, when the reaction product is an aqueous mixture of the D- or L-2-pyrrolidone-5-carboxylic acid, DL-2-pyrrolidone-5-carboxylic acid and glutamic acid, the mother liquor obtained after the separation of the isolated DL-pyrrolidonecarboxylic acid crystals can be used as it is for the next process, namely, fresh glutamic acid material is added and the reconstituted reaction mixture is heated. Thus, the whole glutamic acid material can finally be converted to crystalline DL-2-pyrrolidone-5-carboxylic acid with no loss.

The present process yields the objective DL-2-pyrrolidone-5-carboxylic acid in a dispersed state in water so that the side reaction is suppressed and maintained at a lower level than in the prior process in which the objective acid is obtained in molten state. This serves for further increase of the yield, as well as the avoidance of discoloration of the product and loss of glutamic acid.

When DL-glutamic acid is used instead of D- or L-glutamic acid as the starting material, DL-2-pyrrolidone-5-carboxylic acid can be obtained by the reaction at a lower temperature within a shorter period of time. Thus, a temperature of 100° to 230° C. and a time of 0.2 to 3 hours may ordinarily suffice for the reaction.

The process of the present invention will be more fully described with reference to the following working examples, which are, however, set forth merely by way of illustration and not by way of limitation.

*Example 1*

A mixture of 30 g. of L-glutamic acid and 100 g. of water was heated in an autoclave at 200° C. for 5 hours. The reaction mixture was cooled at 5° to 10° C. overnight to be allowed to isolate crystals of DL-2-pyrrolidone-5-carboxylic acid, which were then filtered by suction, washed with 20 cc. of water and dried. The yield of the DL-2-pyrrolidone-5-carboxylic acid was 17.1 g. The mother liquor contained a dissolved mixture of the 2-pyrrolidone-5-carboxylic acid and glutamic acid, which corresponds to 10.2 g. of glutamic acid (among which 11.8% is L-compound). Accordingly, the net yield of DL-2-pyrrolidone-5-carboxylic acid is 98.5%. The DL-2-pyrrolidone-5-carboxylic acid recovered as crystals is entirely racemic and free from glutamic acid, and has melting point of 181–182° C.

*Example 2*

A mixture of 30 g. of D-glutamic acid and 50 g. of water was heated in an autoclave at 200° C. for 3 hours, and treated thereafter similarly as in Example 1. From the reaction mixture cooled, crystals of DL-2-pyrrolidone-5-carboxylic acid were filtered. To the mother liquor, 20 g. of D-glutamic acid material, which corresponds to the amount of the separated crystals, was added, and the mixture was again heated at 200° C. for 3 hours. Repeating the similar procedure, the result as shown in the next table is obtained.

| Time | D-glutamic acid added, g. | DL-pyrrolidone-carboxylic acid crystals separated, g. |
|---|---|---|
| 1 | 30 | 17.6 |
| 2 | 20 | 17.3 |
| 3 | 20 | 17.4 |
| Total | 70 | 52.3 |

Since the third mother liquor contained, as glutamic acid, 3.5 g. of a mixture of the 2-pyrrolidone-5-carboxylic acid and glutamic acid, the yield of crystallized DL-2-pyrrolidone-5-carboxylic acid corresponds to 99.0%. The acid crystals obtained are entirely racemic and free from glutamic acid, and have melting point of 180.5–181.5° C. Each of the mother liquors contained about 15 to 20% of the D-compound.

*Example 3*

A mixture of 300 g. of D-glutamic acid and 300 g. of water was heated in an autoclave at 200° C. for 3 hours, and then treated as in Example 1. The reaction mixture cooled was filtered to give crystals of DL-2-pyrrolidone-5-carboxylic acid.

To the filtrate, 300 g. of D-glutamic acid was added and heated again at 200° C. for 3 hours. The similar procedures were repeated, giving the result in the following table.

| Time | D-glutamic acid added, g. | DL-pyrrolidone-carboxylic acid crystals separated, g. |
|---|---|---|
| 1 | 300 | 212 |
| 2 | 300 | 255 |
| 3 | 300 | 260 |
| 4 | 300 | 257 |
| 5 | 300 | 262 |
| Total | 1,500 | 1,246 |

The fifth mother liquor contained 70 g. of a mixture of 2-pyrrolidone-5-carboxylic acid and glutamic acid, when calculated as glutamic acid. Accordingly, the yield of 1,246 g. of the crystalline DL-2-pyrrolidone-5-carboxylic acid corresponds to 99.3%. The crystalline acid obtained contained 0.1 to 0.2% of glutamic acid, but was entirely racemic. Each mother liquor contained about 15 to 20% of the D-compound.

*Example 4*

A mixture of 300 g. of DL-glutamic acid and 500 g. of water was heated in an autoclave at 150° C. for 3 hours, and then treated similarly as in Example 1. The crystals of DL-2-pyrrolidone-5-carboxylic acid separated weighed 212 g. The mother liquor contained 55 g. of a dissolved mixture of 2-pyrrolidone-5-carboxylic acid and glutamic acid, when calculated as glutamic acid. Accordingly, the yield of the crystalline acid corresponds to 99%.

*Example 5*

A mixture of 30 g. of D-pyrrolidone carboxylic acid and 50 g. of water was heated in an autoclave at 200° C. for 3 hours. The reaction mixture was cooled at 5–10° C. overnight and then crystalline DL-pyrrolidone carboxylic acid was filtered and dried (26.5 g.). A mixture of pyrrolidone carboxylic acid and glutamic acid, amounting 3.2 g. calculated as pyrrolidone carboxylic acid was still dissolved in the mother liquor. Accordingly, yield of the crystalline DL-pyrrolidone carboxylic acid recovered corresponds to 98.9%. DL-pyrrolidone carboxylic acid was entirely racemic and free from glutamic acid. M.P. 181–182° C.

What is claimed is:

1. A process for the production of DL-2-pyrrolidone-5-carboxylic acid comprising heating optically active glutamic acid with water in an amount of 0.5 to 15 parts by weight per part of the glutamic acid at a temperature of the order of 160° C. to 230° C., cooling the reaction mixture, and separating the crystals of DL-2-pyrrolidone-5-carboxylic acid from the cooled reaction mixture.

2. A process for the production of DL-2-pyrrolidone-5-carboxylic acid comprising heating glutamic acid with water in an amount of 0.5 to 15 parts by weight per part of said glutamic acid at a temperature of the order of 100° C. to 230° C., cooling the reaction mixture of said glutamic acid and said water, separating the crystals of DL-2-pyrrolidone-5-carboxylic acid from the thus-cooled reaction mixture to leave a mother liquor containing glutamic acid and residual 2-pyrrolidone-5-carboxylic acid, adding glutamic acid to said mother liquor until the water is 0.5–15 parts by weight per part of total glutamic acid in said mother liquor wherein said residual 2-pyrrolidone-5-carboxylic acid in said mother liquor is calculated as glutamic acid, heating the thus-reconstituted reaction mixture at a temperature of the order of 100° C. to 230° C., cooling said reconstituted reaction mixture, and separating the thus-produced crystals of DL-2-pyrrolidone-5-carboxylic acid.

3. A process according to claim 2 wherein the glutamic acid to be added to said mother liquor is optically active.

4. A process for the production of DL-2-pyrrolidone-5-carboxylic acid comprising heating glutamic acid with water in an amount of 0.5 to 15 parts by weight per part of said glutamic acid at a temperature of the order of 100° C. to 230° C. for about 0.2 to 5 hours, cooling the reaction mixture of said glutamic acid and said water, separating the crystals of DL-2-pyrrolidone-5-carboxylic acid from the thus-cooled reaction mixture to leave a mother liquor containing glutamic acid and residual 2-pyrrolidone-5-carboxylic acid, adding glutamic acid to said mother liquor until the water is 0.5–15 parts by weight per part of total glutamic acid in said mother liquor wherein said residual 2-pyrrolidone-5-carboxylic acid in said mother liquor is calculated as glutamic acid, heating the thus-reconstituted reaction mixture at a temperature of the order of 100° C. to 230° C., cooling said reconstituted reaction mixture, and separating the thus-produced crystals of DL-2-pyrrolidone-5-carboxylic acid.

5. A process for the production of DL-pyrrolidone-carboxylic acid, comprising heating DL-glutamic acid with water in an amount of 0.5 to 15 parts per a part of said glutamic acid at a temperature of the order of 100° C. to 230° C., cooling the reaction mixture, and separating the crystals of DL-pyrrolidone-carboxylic acid from the cooled reaction mixture.

6. A process for the production of DL-pyrrolidone-carboxylic acid, comprising heating DL-glutamic acid with water in an amount of 0.5 to 15 parts per a part of said glutamic acid at a temperature of the order of 100° C. to 230° C. for about 0.2 to 3 hours, cooling the reaction mixture, and separating the crystals of DL-pyrrolidone-carboxylic acid from the cooled reaction mixture.

7. A process for the production of DL-2-pyrrolidone-5-carboxylic acid comprising heating optically active glutamic acid with water in an amount of 0.5 to 15 parts by weight per part of the glutamic acid at a temperature of the order of 160° C. to 230° C. for about 0.5 to 5 hours, cooling the reaction mixture, and separating the crystals of DL-2-pyrrolidone-5-carboxylic acid from the cooled reaction mixture.

8. A process for the production of DL-2-pyrrolidone-5-carboxylic acid comprising heating glutamic acid with water in an amount of 0.5 to 15 parts by weight per part of glutamic acid at a temperature of the order of 100° C. to 230° C., cooling the reaction mixture, and separating the crystals of DL-2-pyrrolidone-5-carboxylic acid from the cooled reaction mixture.

9. A process for the production of DL-2-pyrrolidone-5-carboxylic acid comprising heating glutamic acid with water in an amount of 0.5 to 15 parts by weight per part of glutamic acid at a temperature of the order 100° C. to 230° C. for about 0.2 to 5 hours, cooling the reaction mixture, and separating the crystals of DL-2-pyrrolidone-5-carboxylic acid from the cooled reaction mixture.

References Cited by the Examiner
UNITED STATES PATENTS 3,185,703  5/1965  Kageyama et al. ____ 260—326.3

NICHOLAS S. RIZZO, *Primary Examiner.*

JOHN D. RANDOLPH, IRVING MARCUS, JOSE TOVAR, *Assistant Examiners.*